United States Patent [19]

Hensolt et al.

[11] 4,306,937
[45] Dec. 22, 1981

[54] SPACER GRID FOR FUEL ELEMENTS AND METHOD OF PRODUCTION

[75] Inventors: Theodor Hensolt, Nuremberg; Manfred Hünner, Erlangen, both of Fed. Rep. of Germany; Anthony Veca, San Diego, Calif.; Peter Rau, Mittelehrenbach über Forchheim, Fed. Rep. of Germany

[73] Assignee: Kraftwerk Union Aktiengesellschaft, Mülheim, Fed. Rep. of Germany

[21] Appl. No.: 97,976

[22] Filed: Nov. 28, 1979

Related U.S. Application Data

[63] Continuation of Ser. No. 843,218, Oct. 18, 1977, abandoned.

[30] Foreign Application Priority Data

Oct. 18, 1976 [DE] Fed. Rep. of Germany ....... 2647000

[51] Int. Cl.$^3$ .............................................. G21C 3/30
[52] U.S. Cl. .................................................. 376/442
[58] Field of Search .................. 176/76, 78; 75/10 R, 75/10 C; 156/664; 204/129.1, 129.5

[56] References Cited

U.S. PATENT DOCUMENTS 3,940,314 2/1976 Knodler .............................. 176/78

FOREIGN PATENT DOCUMENTS 1589051 5/1966 Fed. Rep. of Germany ........ 176/78
7134635 9/1971 Fed. Rep. of Germany ........ 176/78
2431165 6/1974 Fed. Rep. of Germany ........ 176/78

OTHER PUBLICATIONS

Peehs, et al., *Nuclear Technology*, vol. 30, Jul. 1976, pp. 33–46.
Rehme, K., *Nuclear Technology*, vol. 33, May 1977, pp. 314–317.
"VDI-Nachrichten", 1978, No. 14, Apr. 7, 1978, pp. 8 and 10.

*Primary Examiner*—Donald P. Walsh
*Attorney, Agent, or Firm*—Herbert L. Lerner

[57] ABSTRACT

Fuel-element spacer grid with a uniform grid field having polygonal grid-field units and grid crosspieces associated therewith, the grid crosspieces being formed with burls, fuel rods receivable in the respective grid field being centerable at the outer periphery of the fuel rods respectively, at centering surfaces of the burls of the grid crosspieces and retainable axially parallel to one another, the grid crosspieces having a transition region extending therefrom to the centering surfaces of the burls and formed with inclined surfaces for facilitating introduction and withdrawal of the fuel rods, the burls extending over only part of the axial length of the grid, and the inclined surfaces having an inclination angle α with respect to the grid plane and to a normal to the axis of the grid crosspiece such that the inclined surfaces, in turn, extend over only part of the axial length of the burls; and method of producing the spacer grids.

3 Claims, 11 Drawing Figures

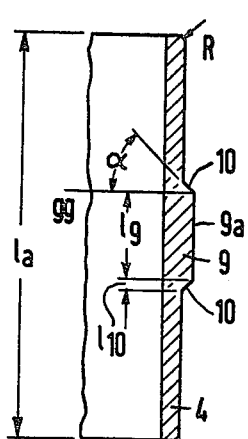
Fig. 3
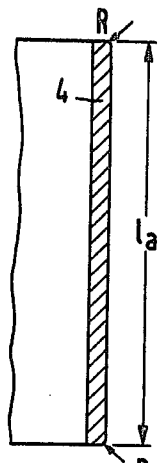
Fig. 4
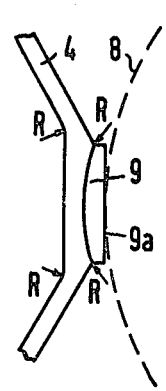
Fig. 5 "-W-"
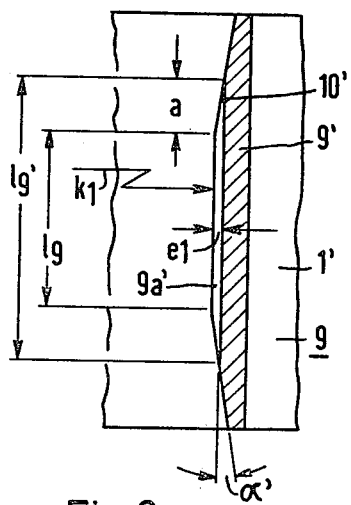
Fig. 6a
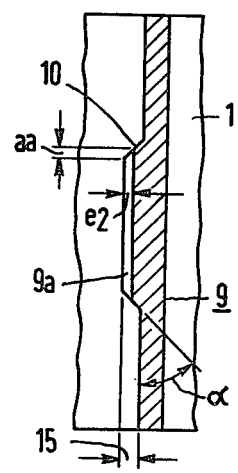
Fig. 6b
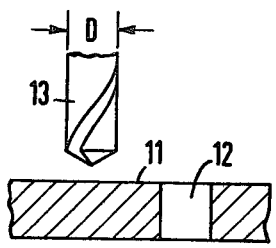
Fig. 8a
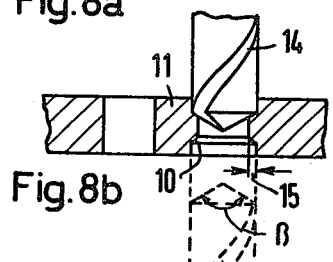
Fig. 8b
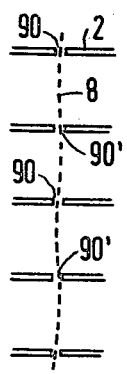
Fig. 7
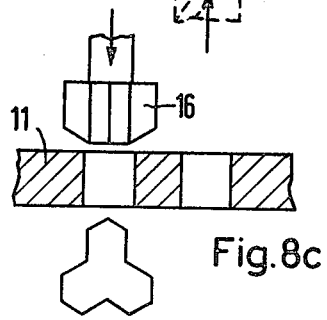
Fig. 8c

SPACER GRID FOR FUEL ELEMENTS AND METHOD OF PRODUCTION

This is a continuation of application Ser. No. 843,218 filed Oct. 18, 1977 now abandoned.

The invention relates to a spacer grid for fuel elements, with a uniform grid field having polygonal grid field units and grid crosspieces associated therewith, the grid field being producible by removing material from a disc or plate member, the grid crosspieces being formed with burls, fuel rods receivable in the respective grid field being centerable at the outer periphery of the fuel rods, respectively, at centering surfaces of the burls of the grid crosspieces and retainable axially parallel to one another, a transition region extending from the grid crosspieces to the centering surfaces of the burls and formed with inclined surfaces for facilitating introduction and withdrawal of the fuel rods; and to a method of producing the spacer grid.

Such a spacer grid has become known heretofore from German Published Nonprosecuted applications DT-OS 2 111 349 and DT-OS 2 227 970. In this connection, the bracing burls extend virtually over the entire axial length of the spacer grid. Such spacer grids have as their function the guidance of a plurality of elongated fuel rods in the grid-field units thereof, also referred to as mesh, and to retain them in nominal position. Generally, a multiplicity of such spacer grids are disposed within the fuel element in mutual alignment and axially spaced from one another, the fuel rods being inserted through the spacer-grid mesh that are disposed in mutual alignment. In various nuclear reactors, especially in fast breeders, such as gas-cooled fast breeder reactors, the transition has been made to machining the spacer grid out of one piece and also thereby to form the burls in a manner that they can be worked or machined out of a whole cross section of a plate or disc-shaped member, because construction of the burls in the form of spring elements or welded-on or soldered-on posts or supports does not ensure the required reliability. So that no scraping or scratching occurs at the surface of the fuel rod when the fuel rods are introduced into the spacer grid, the bracing burls are provided with inclined surfaces at the introduction end as well as at the other end thereof. The axial height or thickness of the spacer grid is determined by the loading, especially the axial weight loading, but also by thermal shift, differential expansion of the rods or element structure and vibration loading; for a fuel element of a specific power or output, the axial thickness of the spacer grid must therefore not fall below a given minimum thickness.

The invention is based upon the consideration that, with the heretofore known spacer grids, the danger existed that, during operation, a pressing of the fuel rods in vicinity of the contact surfaces thereof against the bracing burls can occur due to thermal bowing and volume swelling or expansion, because the contact surfaces extend virtually over the entire axial length of the spacer grid. Furthermore, with the heretofore known grids, it is disadvantageous that the grid mesh or grid field units, when they are worked out of one piece by electro-erosive treatment, especially spark-erosion, exhibit a slight deformation of the crosspieces thereof, which can cause a shift in the center line of the inscribed circle and to a change in the diameter of this circle. If the exact contact surfaces are then formed by further boring or milling operations into the grid member, a great variation is then obtained in the contact surfaces of the bracing burls, since due to the required bevel or facet which intersects with the inscribed circle, the inner periphery of this circle must elongate or shorten axially depending upon the extend of eccentricity. The faceting or beveling of each individual mesh to avoid these inaccuracies signifies a considerable finishing cost which is sought to be avoided in accordance with the invention.

It is accordingly an object of the invention to provide a spacer grid for fuel elements of the foregoing general type and method of producing the same which avoids the foregoing heretofore encountered difficulties. More specifically it is an object of the invention to provide such a spacer grid having entering surfaces of maximal accuracy while simultaneously exhibiting minimal production expense, and by means of which fuel rods can be centered so that, during operation, undesired pressing of the fuel rods against the centering surfaces is sliminated.

With the foregoing and other objects in view, there is provided, in accordance with the invention, fuel-element spacer grid with a uniform grid field having polygonal grid-field units and grid cross pieces associated therewith, the grid cross pieces being formed with burls, fuel rods receivable in the respective grid field being centerable at the outer periphery of the fuel rods, respectively, at centering surfaces of the burls of the grid cross pieces and retainable exially parallel to one another, the grid cross pieces having a transition region extending therefrom to the centering surfaces of the burls and formed with inclined surfaces for facilitating introduction and withdrawal of the fuel rods; the burls extending over only part of the axial length of the grid, and the inclined surfaces having an inclination angle $\alpha$ with respect to the grid plane and to a normal to the axis of the grid cross piece such that the inclined surfaces, in turn, extend over only part of the axial length of the burls.

The axial length of the burls and the degree of the inclination or bevel is able to be determined without difficulty for the respective fuel element; in this regard, the number of spacer grids axially spaced from one another that are to be used and what dimensions the respective fuel rod has, should be taken into consideration. A somewhat wave-shaped or sinusoidal contact of the fuel rod against the respective burls can then provide the basis for the operation i.e. the fuel rod is disposed alternatingly over the axial length thereof against oppositely disposed burls of the axial, sequentially disposed grid field units or mesh.

In accordance with another feature of the invention, the burls are disposed substantially in the middle of the respective grid cross-piece length.

In accordance with a further feature of the invention, the burls extend over $\frac{1}{2}$ or $\frac{1}{8}$, preferably about $\frac{1}{4}$, the length of the respective grid cross-piece lengths. In this case, contact of the fuel rod is ensured only on a small axial piece without the occurrence of pressure or compelling forces in the rod which, from the standpoint of ruggedness and stability, would be less desirable.

In accordance with an added feature of the invention, the inclination $\alpha$ of the inclined surfaces is from 45° to 70°, preferably about 60°, with respect to the grid plane. Through such an inclination, a precentering is attained when introducing the rod, and a scraping, scratching or abrading of the burl-centering surfaces on its side adainst the fuel rod surface is avoided. This advantage applies in the same sense during a withdrawal operation of the rod, for example, for repairing measures during assembly of the fuel element.

In accordance with an additional feature of the invention, the inclination α of the inclined surfaces is equal at both ends of the burl.

In accordance with yet another feature of the invention, the centering surfaces of the burls are planar surfaces disposed on chords so that at most a one-dimensional contact, either punctiform or linear, between said centering surfaces and the fuel rod is formed. The edges of the burls are also advantageously rounded off by radii, in accordance with the invention.

In accordance with yet a further feature of the invention, the grid field has an hexagonal primary form and is made up of substantially duodecagonal grid field units each defining a respective mesh, each of the units encompassing mutually engaging hexagons of an hexagon raster forming the grid field, the hexagons being grouped in threes about a respective central axis, three inwardly projecting side-pairs of the duodecagon being spatially offset from one another 120° about the respective central axis for forming the burls whereby a fuel rod insertable into a respective mesh is centerable by the outer periphery thereof in a three-point contact with respect to the burls.

In accordance with another feature of the invention, there is provided a fuel element body having a plurality of spacer grids disposed mutually planoparallel and axially spaced, each of the hexagonal grid fields of the spacer grids having assembly eyes in vicinity of the six corner points thereof, instead of duodecagonal grid field units, and axia centering elements receivable in the assembly eyes and serving for suspending the spacer grids.

In accordance with the invention, there is also provided a method of producing a spacer grid which comprises initially boring through-bores for mesh corresponding to the outer diameter of a respective fuel rod into a whole disc or plate-shaped blank; then cutting out burls in the through-bores from both sides of the grid with a borer having a greater radius than the through-bores by the amount of the burl projection and having a point angle corresponding to the inclination α of the inclined surfaces of the burl, and countersinking the inclined surfaces; and thereafter removing by electro-erosive treatment, especially spark-erosive or electro-chemical treatment, the remaining material projecting into the mesh, so that the form of the mesh and the planar contact surfaces of the burls are formed on a diameter slightly greater than the diameter of the fuel rod.

Other features which are considered as characteristic for the invention are set forth in the appended claims.

Although the invention is illustrated and described herein as embodied in a spacer grid for fuel elements and method of production, it is nevertheless not intended to be limited to the details shown, since various modifications may be made therein without departing from the spirit of the invention and within the scope and range of equivalents of the claims.

The invention, however, together with additional objects and advantages thereof will be best understood from the following discription when read in connection with the accompanying drawings, in which:

FIG. 3 is a cross-sectional view of FIG. 2 taken along the line III—III in direction of the arrows;

FIG. 4 is a cross-sectional view of FIG. 2 taken along the line IV—IV in direction of the arrows;

FIG. 5 is an enlarged fragmentary view of FIG. 2 rotated slightly counterclockwise and showing the region within the circle W;

FIGS. 6a and 6b are comparative sectional view corresponding substantially to that of FIG. 3, respectively, of a conventional burl profile and of the burl profile according to the invention;

FIG. 7 is a diagrammatic and somewhat exaggerated view, in the interest of clarity of the disposition of a fuel rod at the burls of the spacer grid, according to the invention, in the form of a slightly wave-shaped bending line; and FIGS. 8a, 8b and 8c are diagrammatic views representing three different phases of the method of producing the spacer grid, in accordance with the invention, FIG. 8a showing the boring of the grid through-bores or passageways, FIG. 8b the cutting-out of the burls by countersinking, and FIG. 8c the spark or electro-erosive treatment of the through-bores to remove the remaining material.

Figure 1:
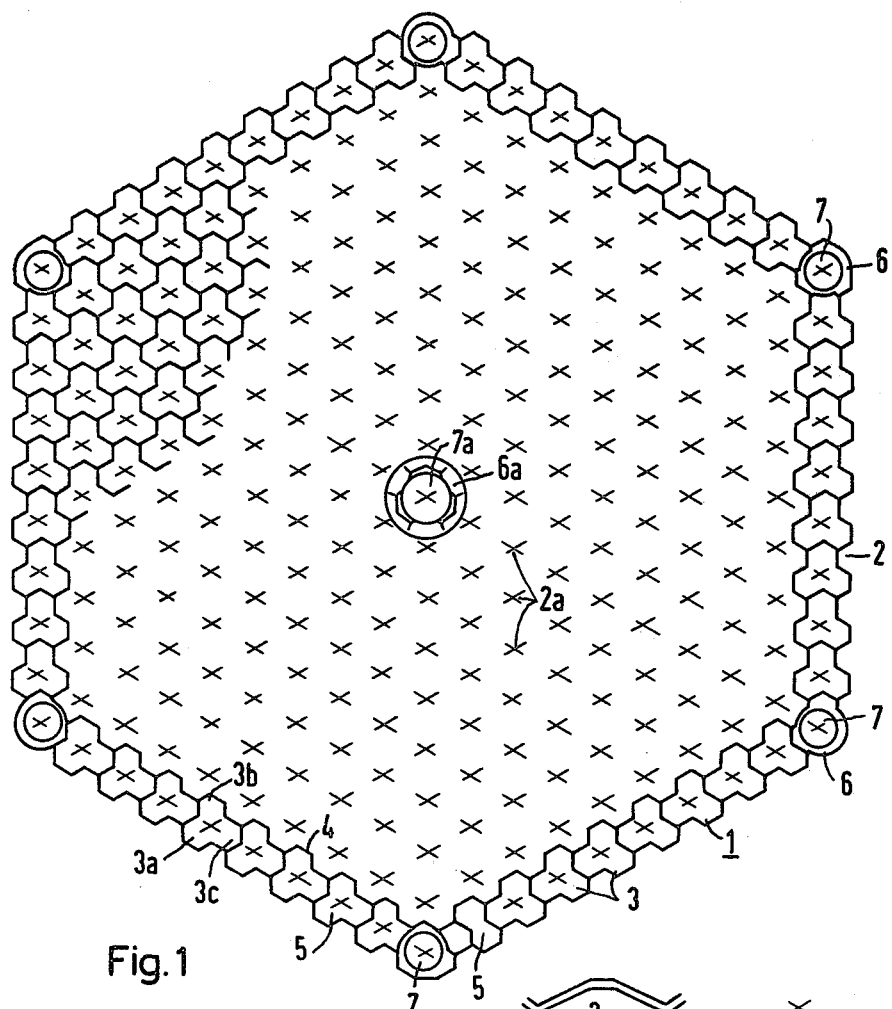
FIG. 1 is a bottom plan view of a spacer grid according to the invention, part of the grid field units or mesh thereof being indicated only by intersecting lines since the construction viewed over the entire grid is uniform.

Referring now to the drawing and first, particularly, to FIG. 1 thereof, there is shown a spacer grid 1 for fuel elements, preferably for a gas-cooled fast-breeder reactor. Basically, the spacer grid 1 is utilizable, however, also for other types of nuclear reactors such as pressurized-water or boiling-water reactors, for example. The spacer grid 1 referred to hereinafter more simply as grid 1 has a substantially hexagonal or six-corner grid field 2 with individual grid field units or mesh 3 and grid crosspieces or bars 4 defining the mesh 3. It is apparent that the grid field 2 is formed of a multiplicity of duodecagonal grid-field units or mesh 3, which encompass respectively, three hexagons 3a, 3b and 3c grouped about a central axis 5 and bordering on one another (note also the enlarged view of FIG. 2), the hexagons 3a, 3b and 3c being part of the hexagon-raster 2a upon which the grid field 2 is based.

The grid field 2 is producible by cutting or machining material out of a disc or plate member of suitable primary form, as is described hereinbelow in greater detail. A multiplicity of the spacer grids 1 shown in FIG. 1 are assembled in mutually planoparallel disposition, aligned with respect to one another and spaced from one another into a fuel element body containing fuel rods inserted into the fuel element body in mutually axially parallel relationship, the fuel rods being omitted from FIG. 1, however. When all the fuel rod positions of the grid field 2 are occupied, two hundred sixty-four fuel rods have been inserted into the illustrated grid 1 and if, as described, an assembly into a fuel element body is to result, assembly eyes 6 are provided instead of the respective duodecagon mesh 3 at the points of the hexagonal grid field 2, the assembly eyes 6 being insertable with axial, rod-shaped centering elements 7. In a corresponding manner, instead of a fuel rod position, a further centering rod 7a is inserted in the center of the grid 1, the respective mesh being identified as 6a.

Figure 2:
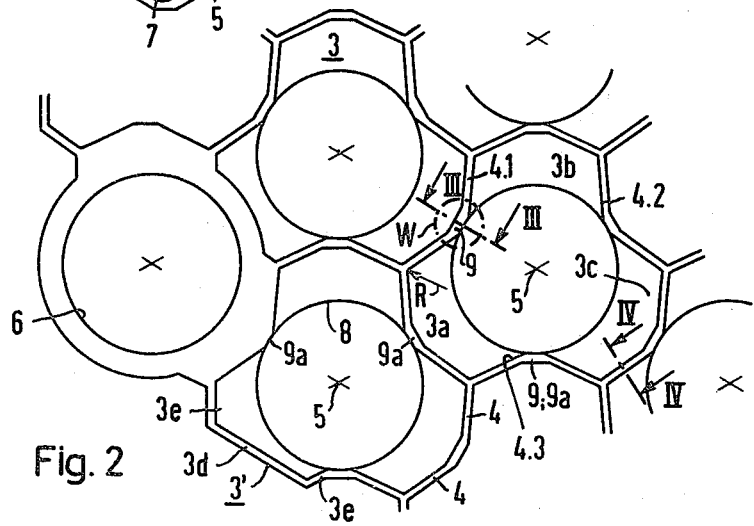
FIG. 2 is an enlarged fragmentary view of FIG. 1.

As shown more clearly in FIG. 2, the fuel rods represented by their outer contours 8 are inserted into the respective grid field with the outer periphery, respectively, thereof centered at centering surfaces 9a of burls 9 of the grid cross-pieces or bars 4 and held axially parallel to one another. FIG. 3 taken together with FIG. 2 shows that the transition region from the grid cross-pieces 4 to the centering surfaces 9a of the burls 9 is provided with beveled or inclined surfaces 10 which facilitate the introduction or withdrawal of the fuel rods 8. In the illustrated embodiment, three inwardly projecting side pairs 4.1, 4.2 and 4.3 of the duodecagonal mesh 3, that are respectively rotated spatially through 120° relative to one another about the central axis 5 thereof, are provided for forming the burls 9. The fuel rod 8 that is to be inserted into the respective mesh 3 (hereinafter, in the interest of simplification, the expression mesh will be used instead of grid field unit) is thereby very accurately centerable with respect to the burls 9, with the outer periphery of the fuel rod 8 in a three-point bearing or support.

As further shown in FIG. 2, the outer mesh 3, for example, the mesh 3' shown at the bottom of FIG. 2, which border directly upon the eye 6, are not point-symmetric as are the remaining mesh 3 of the grid field 2, but rather are constructed partly asymmetrically with the grid cross-pieces 4 thereof through elongations 3d and shortened portions 3e so that the outer contours of the grid field 2 are aligned with those of the centering eyes 6; for the three-point bearing-fastening means this does not mean any change. A comparison of the cross-sectional views of FIGS. 3 and 4 in connection with FIG. 2 is provided in the drawing showing that the burls 9 are disposed at the middle of the respective axial length of the grid cross-piece $l_a$. The centering surface 9a of the burls 9 thereby extend over about $\frac{1}{4}$ the length $l_a$ of the grid cross-piece i.e. the axial length of $l_9$ of the centering surface 9a of the burls 9 is about $\frac{1}{4} l_a$. With an axial grid cross-piece length $l_a = 13$ mm, an advantageous value of 4 mm for the axial length $l_9$ has been obtained, eight grids 2 being used uniformly distributed over the fuel-rod length, and the total length of the fuel rods being 2100 mm. A preferred range for the axial length $l_9$ is $\frac{1}{2}$ to $\frac{1}{8} l_a$. The exact values are readily determinable depending upon the fuel-rod length and the grid thickness through assumption of the deformation line of the fuel rod. The slope $\alpha$ of the inclined surface 10 to the grid plane gg is 60° in the illustrated embodiment. This slope or inclination is the same at both ends of the burl 9. This value has proven to be advantageous because, on the one hand, insertion of the fuel rods into the grid is thereby readily possible with precentering and, on the other hand, the boring tool can also be furnished with a sharp angle necessary for producing this bevel or inclined surface, without any problems. A preferred range for the slope or inclination of the inclined surfaces or chamfers is located between 45° and 70°.

FIG. 5 shows that the centering surfaces 9a of the burls 9 are planar surfaces located on chords so that a punctiform or linear engagement with respect to the outer periphery of the fuel rods 8 is produced, as clearly indicated by the broken-line representation of the circle 8.

FIG. 6b illustrates the advantage of the burl shape according to the invention over the conventional burl shape shown in FIG. 6a, wherein the conventional burl 9' is provided with inclined surfaces 10' which are considerably steeper than the inclined surfaces or bevels 10 of the embodiment of the invention shown in FIG. 6b. In the inventive embodiment of FIG. 6b, the angle of inclination is only 3°, the inclination beginning beforehand at the upper or lower side of the grid 1', as clearly shown in FIG. 6a. Tests with the conventional burl form according to FIG. 6a have established that, depending upon an eccentricity el of the inscribed circle k1, a tolerance a in the axial length $l_9$ of the centering surface 9a' occurs, so that, under certain conditions, instead of the axial length $l_9$, an axial length $l_9$, of the centering surfaces can also occur. This high tolerance can be caused by the fact that during electro-erosive treatment of the full cross section, a distortion of the grid 1' can occur so that when boring the inscribed circle k1 and working-in the inclined surfaces 10', the indicated high tolerances occur. In contrast thereto, in the grid construction according to the invention as shown in FIG. 6b, as a result of an assumed eccentricity e2, which is actually greater than the eccentricity el to emphasize or clarify the advantage, a tolerance is to be determined, contrarily, which is considerably lower i.e. smaller by one order of magnitude, than the tolerance a.

FIGS. 8a, 8b and 8c clarify the inventive method of the invention for producing a grid 1 having the features shown in FIGS. 1 to 5 as well as in FIG. 6b. According to FIG. 8a, through-bores 12 corresponding to the outer diameter of the fuel rod 8 for forming the mesh 3 are initially bored in a whole disc or plate member e.g. a blank 11, the borer 13 of an otherwise non-illustrated boring machine having a corresponding diameter D. Thereafter, in accordance with FIG. 8b, with a borer 14 having a radius which is greater than that of the bores 13 by a distance 15 corresponding to the distance of the burl projection and which is provided with a point angle $\beta$ corresponding to the inclination of the inclined or beveled surface 10 (FIG. 6b), the burl 9 is cut out or machined from both sides of the grid 1 and the inclined or beveled surfaces 10 are countersunk. The grid 1 is thereby initially machined or bored from one side thereof and, thereafter, from the other side thereof by the bores 14. Finally, in accordance with FIG. 8c, the remaining projecting material of the respective mesh 3 is removed by electro-erosive techniques and treatment with a tool electrode 16. Spark-erosive treatment comes to mind especially with regard hereto; basically, however, an electrochemical countersinking would also be suitable. The spark-erosive treatment or operation has the advantage, however, of greater accuracy. With the spark-erosive operation, the mesh 3 can consequently maintain the final form thereof as shown in FIG. 2 and, moreover, the burls 9 can maintain the planar engagement or contact surfaces 9a (note FIG. 5) thereof by means of this spark-erosive treatment.

As a special advantage of the method of the invention, it is found that a distortion or undesired deformation of the grid 1 cannot occur with the treatments or operations according to FIGS. 8a and 8b. The defined cold work or strain-hardening is maintained, on the contrary. This is necessary in order to improve the behavior or characteristics of the spacer in the neutron flux. In the last step of the method of the invention as shown in FIG. 8c, the final exact form of the spacer grid 1 is produced.

FIG. 7 shows diagrammatically the bending line of the fuel rod 8 when it is centered at the individual grid fields 2 within a fuel element. It is apparent from FIG. 7 that the fuel rod alternatively comes into contact with mutually oppositely disposed burls 90 and 90'. Since the contact surface of the fuel rod 8 with respect to the centering surface 9a, as hereinaforedescribed, is only linear or punctiform, virtually no undesired constraints or compelling forces are able to be developed at the fuel rods within the fuel-element spacer-holder thereof. It should also be noted that rounding-off radii in FIGS. 2 to 5 are indicated by arrows R. An alloy steel of the type X8 Cr Ni Mo Nb 1616 (German Standards) has, for example, been found to be advantageous as material for forming the grid 1.

We claim:

1. In a fuel-element spacer grid with a uniform hexagonal grid field made up of a plate-like member formed with a multiplicity of recesses, the grid field having polygonal grid-field units and grid crosspieces associated therewith, the grid crosspieces being formed with burls having, extending in axial direction of the grid, mutually inclined surfaces with a respective centering surface disposed transversely thereto, fuel rods receivable in the respective grid field being centrable at the outer periphery of the fuel rods, respectively, at centering surfaces of the burls of the grid crosspieces and retainable axially parallel to one another, the grid crosspieces of the respective grid field units alternatingly having, in circumferential direction of the fuel rod received in the respective grid field units, a substantially concave and a substantially convex configuration with respect to the fuel rod received therein, the centering surfaces of the burls being located on the grid crosspieces having the substantially convex configuration, the improvement comprising in combination, the burls extending over only part of the axial length of the grid, and the grid crosspieces having a transition region extending therefrom to the centering surfaces of the burls and formed with inclined surfaces for facilitating introduction and withdrawal of the fuel rods, the inclined surfaces having an inclination angle $\alpha$ with respect to the grid plane and to a normal to the axis of the grid crosspiece such that the inclined surfaces extend over only part of the axial length of the burls.

2. Spacer grid according to claim 1 wherein the burls are disposed substantially in the middle of the respective grid crosspiece length, and said centering surfaces thereof extend over $\frac{1}{2}$ to $\frac{1}{8}$ the length of the respective grid crosspiece lengths.

3. Spacer grid according to claim 1 wherein said inclination $\alpha$ of the inclined surfaces is from 45° to 70° with respect to the grid plane and is equal at both ends of the burl.

* * * * *